United States Patent [19]

Keith et al.

[11] 3,791,143
[45] Feb. 12, 1974

[54] PROCESS AND APPARATUS

[75] Inventors: Carl D. Keith, Summit; John J. Mooney, Wyckoff, both of N.J.

[73] Assignee: Engelhard Minerals & Chemicals Corporation, Murray Hill, N.J.

[22] Filed: Nov. 10, 1971

[21] Appl. No.: 197,348

[52] U.S. Cl.................. 60/274, 23/288 F, 60/284, 60/286, 60/288, 60/300, 423/214
[51] Int. Cl............................................... F01n 3/14
[58] Field of Search..... 60/274, 284, 286, 300, 288; 423/212, 213, 214; 23/288 F; 123/1 A

[56] References Cited
UNITED STATES PATENTS

| | | | |
|---|---|---|---|
| 3,203,168 | 8/1965 | Thomas............................... | 60/286 |
| 3,226,206 | 12/1965 | Hettich................................ | 60/286 |
| 3,273,971 | 9/1966 | Baddorf............................... | 60/288 |
| 3,306,035 | 2/1967 | Morrell................................ | 60/286 |
| 3,440,817 | 4/1969 | Saufferer............................. | 60/288 |
| 3,473,523 | 10/1969 | Hilborn............................. | 123/119 R |

FOREIGN PATENTS OR APPLICATIONS

| | | | |
|---|---|---|---|
| 1,308,736 | 10/1962 | France................................. | 60/284 |

Primary Examiner—Douglas Hart
Attorney, Agent, or Firm—Morton, Bernard, Brown, Roberts & Sutherland

[57] ABSTRACT

There is disclosed a process for purifying exhaust gases containing carbon monoxide and hydrocarbons which is highly effective, even when starting cold engines. The system employs a plurality of catalytic zones, preferably the initial catalyst zone being in a separate vessel positioned near the engine manifold, and supplemental fuel is charged to the initial catalyst zone at least during start-up of the engine. After engine start-up, the exhaust gases may be by-passed around the initial catalyst zone and into a subsequent catalyst zone which has been heated during the start-up period by gases passing from the initial catalyst zone. The supplemental fuel addition may be stopped after a predetermined time from the beginning of engine operation. A preferred supplemental fuel is methanol, and preferred catalysts are of the honeycomb type.

20 Claims, 1 Drawing Figure

3,791,143
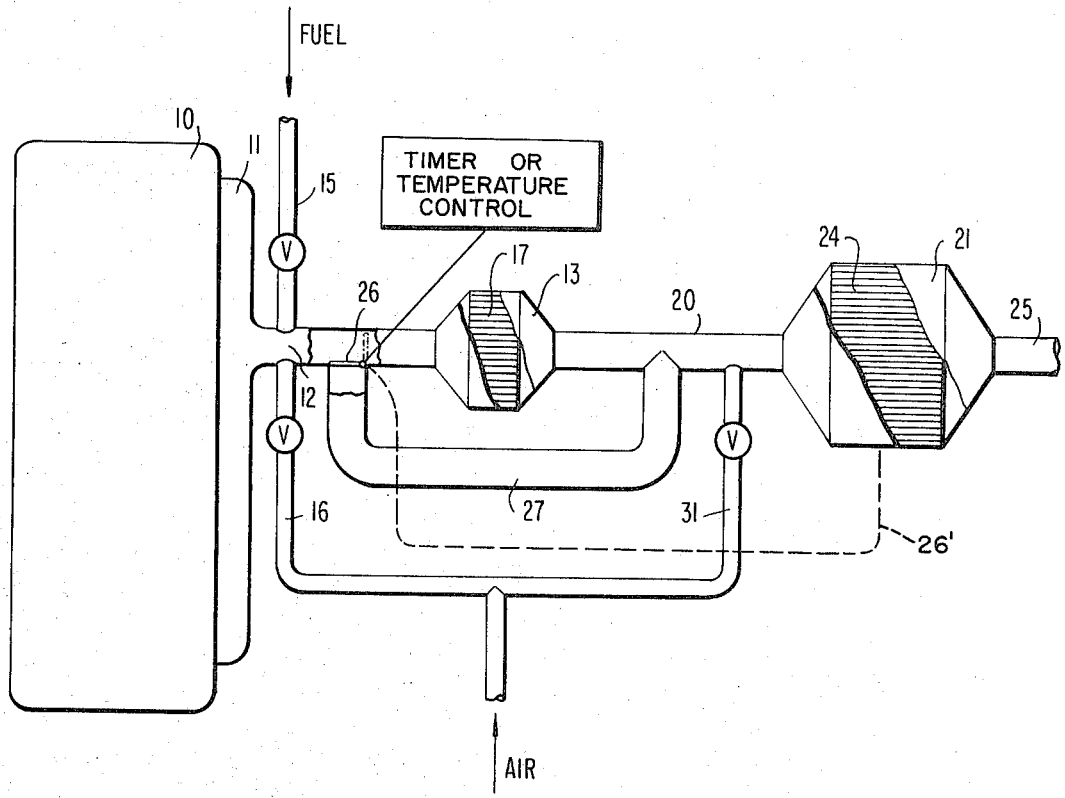
INVENTORS
CARL D. KEITH
JOHN J. MOONEY
BY Morton, Bernard, Brown,
Roberts & Sutherland
ATTORNEYS

PROCESS AND APPARATUS

This invention relates to catalytic processes for purifying gases, and the invention finds particular utility in the treatment of exhaust gases from internal combustion engines in order to decrease pollution of the atmosphere. The invention is especially concerned with overcoming pollution problems associated with engine start-up and subsequent operation.

Gases of various sorts are often discharged or exhausted into the air and frequently these gases serve to add undesirable materials or pollutants to the atmosphere. Although the problem has been under study for years and many different types of systems have been devised for combatting the difficulties, it is becoming increasingly important that such pollution be avoided. Particular problems arise in the purification of exhaust gases emanating from internal combustion engines such as those employed in automotive vehicles. The exhaust products from the engines, which usually burn a hydrocarbon fuel such as hydrocarbon gases, gasoline or diesel fuel, can cause serious pollution of the atmosphere. Among the pollutants in these exhaust gases are hydrocarbons and oxygen-containing compounds, the latter including nitrogen oxides and carbon monoxide. The removal of these contaminants from the gases or the conversion of the pollutants to less objectionable materials is of significant importance to the well-being of our society.

The most practical systems devised for treating these exhaust gases employ catalysts which serve to convert the pollutants to less harmful materials by, for instance, oxidation. Typically, the exhaust gases and air are passed over the catalyst which is at an elevated temperature maintained as a result of the heat in the exhaust gases and the exothermic nature of the oxidation reactions. Due to the inherent difficulties of such systems which frequently arise because of limitations of space and costs, the design of the systems is important if the catalyst is to perform adequately over significant periods of engine operating time. During start-up of even well-designed current commercial engines, the amounts of carbon monoxide and hydrocarbons in the exhaust gas are higher than during normal engine operation, and may be at start-up of the order of about 3 to 10 or more volume percent carbon monoxide (versus about 0.5 to 3 percent CO during normal operation), and about 750 to 2,000 parts per million of hydrocarbons (versus about 100 to 750 parts per million during normal operation), and yet, at this time when it is most needed, the catalytic converter may be ineffective since its temperature may be too low to initiate the desired oxidation reactions. Of course, as engine operation continues, the catalyst is brought to a temperature where it does cause the oxidation reactions to commence and the resulting exothermic heat, along with the heat of the exhaust gases, raises the catalysts to operating temperature, but in the meantime, excessive amounts of carbon monoxide and hydrocarbons may have been discharged to the atmosphere. Thus, during the initial start-up period of the engines, there results an objectionably high discharge of pollutants into the atmosphere, and this is particularly true of engines and their exhaust systems, which have cooled to a substantial extent from operating temperature. "Cold" engines, i.e., those which are essentially at atmospheric temperature, are a considerable problem in this regard.

One might avoid these start-up difficulties by electrically heating the catalytic converter before starting the engine, but this would unduly increase costs and also cause unacceptable delays before the engine could be started with the assurance that undesirable pollution of the atmosphere would not occur. In fact, this initial pollution in modern, well-designed engines may be a controlling factor in satisfying some regulations which are being promulgated with regard to the operation and control of internal combustion engines. For example, in one regulation, the pollutant output of the engine is measured for an initial period starting from a cold engine, and many engines will not satisfy the specifications because in the first period of operation, while the catalytic converter is at a relatively ineffective temperature, the emissions of carbon monoxide and hydrocarbons from the exhaust system are excessive and even a major amount of the total of such pollutants that are passed to the atmosphere over the total test period, for instance, in the first 200 seconds of engine operation, there may occur about 80 to 90 percent of the CO and hydrocarbons discharged over the total test period.

For many years, the designers of catalytic conversion systems for these exhaust gases have recommended that the devices be placed as close to the engine as physically possible to minimize the emission of pollutants during the initial engine start-up period. The closer the catalyst is to the engine, the hotter will be the exhaust gas when it contacts the catalyst and the faster the temperature of the catalyst will be raised to operating level. However, due to limitations of space in most vehicles, the location of the total amount of catalyst in the system near the engine is difficult, and as a result, the catalyst has sometimes been placed in a plurality of vessels, one of which may be more or less immediately adjacent the engine exhaust manifold while another catalytic converter is in the general vicinity of the usual muffler and thus is beneath or to the rear of the passenger section of the vehicle. In any event, the portion of the catalyst in the initial vessel has a better chance to reach an effective operating temperature in a relatively short time and can therefore serve quicker to initiate the oxidation reactions during the engine start-up period. This heating is facilitated by the fact that the amount of catalyst in the initial converter is frequently a minor portion of the total amount of catalyst in the system and is heated quicker than if the total catalyst were in one vessel near the engine. As the exhaust gases pass through the first catalytic converter, the oxidation reactions ocdur and the exothermic reactions serve to heat the catalyst and the exhaust gases. Typically, the conversion of 1 percent of carbon monoxide in a gas to carbon dioxide or of 1,000 parts per million of $C_6H_{14}$ organic material to carbon dioxide and water, raises the temperature of the gas about 90° C. The heated gases are then passed to the subsequent catalyst converter in the system and act to heat its catalyst to an effective temperature sooner than would normally occur if part of the catalyst were not placed near the exhaust manifold of the engine. Less advantageously from the quick heating standpoint, the initial catalyst may be positioned further away from the exhaust manifold and even housed in the same vessel as the subsequent catalyst.

The foregoing described multiple catalyst converter operations are advantageous, but problems may also arise in these systems and cause them to be ineffective in satisfying pollution regulations. The initial catalyst is generally a minor weight amount of the total catalyst in the exhaust system, but yet the initial catalyst contacts the most contaminated exhaust gases and is thus subjected to the greatest amounts of catalyst poisons. Also, when the initial catalyst is located near the engine, the catalyst may be subjected to higher temperatures over long periods of time which can also lead to undesirably short catalyst life. To reduce these detrimental effects, it has been proposed to devise a system with a by-pass around the initial catalyst so that the exhaust gases pass through this portion of the catalyst only during the period when the subsequently-in-line catalyst is below an effective operating temperature, for instance, during start-up of a cold engine. In this type of operation, it has been suggested that the by-pass be thermostatically controlled according to the temperature of the subsequently-in-line catalyst. Even in this system, however, sufficient reduction of the amount of pollutants passed into the atmosphere may not occur and it is therefore becoming imperative to improve such operations.

By the present invention, we have devised processes for purifying exhaust gases, especially those which emanate from multiple cylinder, reciprocating, internal combustion engines. Our systems have features which define overall, highly advantageous operations with excellent purification of the exhaust gases even during cold engine start-up periods. In the systems of the present invention, we employ an initial catalyst, preferably in a separate converter vessel placed near the engine, for instance, closely adjacent the exhaust manifold; and a subsequently-in-line catalyst. The latter catalyst may be housed in the same vessel as the initial catalyst, but preferably the subsequent catalyst is in a separate vessel which is in a spaced-away flow relationship with respect to the initial catalyst vessel. During the engine start-up period, the exhaust gases are passed from the engine to the initial catalyst and through a subsequently-in-line catalyst. The initial catalyst can be with advantage of the unitary or honeycomb-type and preferably contains as an active catalytic member, one or more of the elements of the platinum group, especially palladium, supported by a carrier such as a calcined or activated alumina.

When contacting the initial catalyst during engine start-up, the exhaust gases are combined with an extraneous or supplemental fuel, and also, the mixture includes an oxygen-containing gas. The oxygen can be supplied by the engine, for instance, in a lean fuel operation, but the engine is usually operated on the fuel-rich side during start-up. It is thus preferred to introduce oxygen into the exhaust gases before or as they contact the initial catalyst. The systems may also provide for the use of this initial catalyst and the extraneous fuel introduction only during engine start-up. Subsequently, the extraneous fuel introduction can be stopped and the exhaust gases can, if desired, be by-passed around the initial catalyst and contacted with the subsequent-in-line catalyst which has also been on stream during the start-up period and brought to or near a temperature at which the catalyst is effective to promote the desired oxidation reactions. By these features and mode of operation of the systems of the present invention, excellent purification of the exhaust gas is obtained even during engine start-up periods and yet the catalysts remain active over relatively long operating periods. Other features and advantages of the invention will be realized from the following, more detailed description of certain specific embodiments of the invention.

The invention will be further described in connection with the accompanying drawing in which a preferred system of the present invention is shown diagramatically for illustrative purposes.

In the drawing, there is shown a spark-ignition, internal combustion engine 10 of the automotive-type having an exhaust manifold 11. The initial catalyst is in converter 13 which is placed closely adjacent the engine manifold, and preferably close enough so that the gas inlet side of the catalyst element 17 in the converter can reach a temperature of at least about 400° F. within about 20 seconds of the beginning of sustained engine combustion, preferably at least about 400° F. within about 10 seconds, when the engine and its exhaust system are at a temperature of about 68° to 86° F. before starting. Such distance may be, for instance, less than about 12 inches from the manifold with respect to the mean flow path of the exhaust gases, and this distance is preferably less than about 6 inches. When the initial catalyst is about 18 or more inches from the exhaust manifold, the catalyst is accordingly heated more slowly. During start-up of the engine 11, the exhaust gases are passed from manifold 11 through line 12 and into catalytic converter 13 (shown partly broken-away) which houses a honeycomb-type catalytic element 17 having an active metal component comprising a platinum group metal. An extraneous or supplemental fuel is added through valved line 15 to the exhaust gas in line 12 during the engine start-up period to insure that the initial catalyst is brought quicker to a temperature which initiates and sustains oxidation of carbon monoxide, and, preferably also hydrocarbons, in the exhaust gas. Line 15 can have a restricted orifice and the upstream pressure on the fuel can be varied so that the amount of fuel fed through the orifice and thus into line 12 is higher at higher inlet manifold vacuums.

Sufficient molecular oxygen needed to support the oxidation of at least the major amount of the extraneous fuel and oxidizable constituents of the exhaust gas, preferably sufficient to oxidize essentially all of these materials, can be present in the gas passing from the engine when it is operated on a lean fuel-oxygen mixture, but preferably most of the oxygen used in the catalysts is added in the form of air or other oxygen-containing gas, for instance, by valved line 16 which discharges into line 12. The oxygen introduction into the exhaust gases is preferably conducted throughout the operation of the engine by an electrically-operated air pump (not shown) discharging into the connection of lines 16 and 31 whenever the ignition is on. Air can also be supplied by a belt-driven fan. Oxygen is introduced at least whenever the oxygen content of the exhaust gases is below that required for adquate combustion of the extraneous fuel and for adequate combustion of the combustible or oxidizable constituents in the exhaust gas during any period of engine operation. Preferably, the amount of oxygen supplied is in excess of that necessary to convert on a stoichiometric basis, the extraneous fuel and hydrocarbons and carbon monoxide in the exhaust gas, to water and carbon dioxide at all times of engine operation.

Referring again to the drawing, the gases emanating from the initial catalyst converter 13 are discharged through line 20 and passed thereby to the subsequently-in-line catalyst converter 21 (shown partly broken-away) which also contains an oxidation catalyst, preferably a honeycomb-type catalyst 24. Throughout the initial start-up period, which may be, for example, from about 1.5 to 5 minutes from the beginning of sustained combustion in or operation of engine 10, preferably about 2 to 4 minutes, and during normal engine operation, the gases are passed through catalytic converter 21 where, during engine start-up, any oxidizable constituents in the gases which have not been converted in catalyst converter 13 may be oxidized. During start-up of the engine, the second-in-line catalyst converter 21 is heated by hot effluent gases coming from the initial catalytic converter 13, and as the temperature rises in catalytic converter 21 its catalyst becomes more effective in promoting the various oxidation reactions involving the exhaust gas and any extraneous fuel employed. The effluent from catalytic converter 21 passes by line 25 to the atmosphere. Converter 21 may be spaced away from converter 13 a considerable distance, say at least about 1 foot as measured by the mean gas flow path. More often, this distance is at least about 2 feet and will usually not exceed about 5 to 10 or so feet.

The systems of the present invention preferably contain an exhaust gas by-pass line 27 which provides a gas flow path around the initial catalyst. For example, during the initial period from engine start-up, for instance, for about 1-½ to 5 minutes from the beginning of sustained combustion in or operation of engine 10, preferably for about 2 to 4 minutes, swing valve 26 which normally closes line 27 when the engine is not in operation, remains in this position. Thus, during this period which may be for a predetermined time after sustained combustion begins in the engine, the mixture containing exhaust gas, extraneous fuel and oxygen passes from line 12 through the initial catalyst converter 13 as described above. At the end of the engine start-up period, valve 26 can be actuated to close or at least restrict the entry to catalyst converter 13 and to open by-pass line 27. Valve 26 is held in this position as long as the ignition is on. The mixture of exhaust gas and oxygen then goes via by-pass line 27 around catalyst converter 13 and through line 20 to catalytic converter 21 and exhaust line 25. By the time valve 26 assumes this position, the catalyst in converter 21 has been brought to an effective operating temperature and serves to adequately oxidize the pollutants of the gas so that undue contamination of the atmosphere is avoided.

Oxygen for the operation of catalytic converter 21 may be in the exhaust gas as a result of lean engine operation, and oxygen may be added to the exhaust gas by the time it reaches catalytic converter 21. Thus, oxygen may be supplied through line 16 or, for instance, by another valved line 31 entering line 20. When engine operation ceases by turning off the ignition key, valve 26 resets to its initial position whereby by-pass line 27 is closed and the entry to catalyst converter 13 is open from line 12. When the engine is subsequently started, the exhaust gases and extraneous fuel, along with oxygen, will again pass into catalytic converter 13, regardless of the temperature of the catalyst in converter 21 if valve 26 is time actuated as measured from initial sustained combustion. Thus, in such case, the initial start-up sequence will occur each time the engine is started, to insure against contamination of the atmosphere. By this procedure, it is assured that undesirably large amounts of carbon monoxide and hydrocarbons will not be present in the exhaust gas going into the atmosphere, and a much more effective and desirable operation is obtained.

Instead of being a timed operation, the by-passing of gases around catalyst converter 13 may be controlled thermostatically as shown schematically by dotted line 26' according to the temperature of the catalyst in converter 21. In this operation, the by-pass line 27 could be closed with the exhaust gas having access to the initial converter 13 when the catalyst in converter 21 is below a temperature sufficient to effect the desired oxidation reactions, but the by-pass line 27 would be in use when the catalyst in converter 21 is at an effective temperature in this regard. Alternatively, the by-pass line 27 could be closed only during operation of the automatic choke when the engine is started. The provision of the by-pass, although preferred, does add to the expense of the system and, in some instances, may not be necessary, especially if the effective life of the catalyst in the initial converter 13 is satisfactory, even if always in the exhaust gas flow path.

In a preferred operation of the present invention, the engine is an eight-cylinder hydrocarbon gasoline powdered, four-stroke internal combustion engine operating on a non-leaded fuel of 91 research octane number rating. The exhaust gas during engine operation contains about 0.3 to 7 volume percent CO, about 100 to 750 p.p.m. by volume of hydrocarbon constituents, and about 1 to 4 volume percent oxygen in excess of stoichiometric. The initial converter 13 contains a honeycomb catalyst which is 2-21/32 inches in diameter and 1 inch thick in the direction of gas flow. The skeleton structure of the honeycomb has walls about 8 mils in thickness and is made of cordierite and alpha-alumina. There are about 180 flow paths per square inch of cross-section of the catalytic element and the gas flow paths through the element are essentially straight and do not communicate directly with each other through their side walls. The wall of the element has a thin coating of activated alumina which is about 12 percent by weight of the cordierite-alpha-alumina support. The alumina coating contains about 1 percent palladium catalyst based on the total weight of the catalytic element.

The catalytic converter 21 contains a honeycomb-type catalyst element having the same cordierite-alpha-alumina support as the catalyst in converter 13; however, the diameter of the element in converter 21 is 4-21/32 inches while its thickness or length is 3 inches. The element has 15 weight percent of activated alumina as a thin coating on the walls of the gas flow paths and the alumina contains 0.2 weight percent platinum in catalytically active form.

The engine and its exhaust system are at 70° F. when the engine is started. The engine start-up period is 2 minutes from initial sustained combustion in the engine during which time air at the rate of 2 percent by volume in excess of that needed for complete combustion, based on the volume of exhaust gas flow, is passed by line 16 into line 12. Throughout this start-up period, methanol as the extraneous fuel is discharged from line 15 into line 12 at the rate of 1 percent based on the volume of engine exhaust gas flow.

After 2 minutes of such operation, the temperature of the gas inlet end of catalytic element 17 can be, for example, about 800° F., and the temperature of the gas inlet end of catalytic element 24 can be about 500° F. At the end of the 2 minute engine start-up period, valve 26 moves to open by-pass line 27 and restrict the access of exhaust gases to the inlet of converter 13. Extraneous fuel addition is cut-off at this time but air continues to be supplied to line 12 via line 16 or through line 31, at the same rate as during engine start-up. The exhaust gas air mixture then passes through lines 27 and 20 to catalytic converter 21 and normal operation of the engine and exhaust gas system is established. After a period of normal engine operation, the engine is stopped and valve 26 resets to the position of closing line 27 but opening exhaust gas access between line 12 and catalytic converter 13. When the engine is again started, the foregoing start-up procedure will reoccur. Catalytic coverters 13 and 21 may be constructed as described in U. S. Pat. Nos. 3,441,381 and 3,565,830.

The amount of extraneous or supplemental fuel introduced into the exhaust gas in the initial engine start-up period of this invention, may be sufficient to bring the temperature of the gas inlet side of the initial catalyst from about 70° F. to at least about 400° F. within about 20 seconds of initial sustained engine operation, preferably to at least about 400° F. within about 10 seconds. Such amounts of supplemental fuel often fall in the range of about 0.5 to 3 volume percent, preferably about 0.7 to 1.5 volume percent, based on the exhaust gas, but may depend, however, on the heating quality of the fuel, the amount of oxygen present, the distance converter 13 is away from the engine, and other conditions of the operation. The extraneous fuel may be a gas at ambient conditions, but is preferably normally liquid. The fuel may be hydrocarbon in nature and, for instance, boiling primarily in the range of up to about 600° F. at atmospheric pressure, and may be a mixture of hydrocarbons having from 3 to 12 carbon atoms. Advantageously, the extraneous fuel consists essentially of carbon, hydrogen, and oxygen, and we prefer to employ an alkanol of 1 to 4 carbon atoms as the extraneous fuel, especially methanol. The extraneous fuel preferably has a heating value of at least about 5,000, preferably at least about 7,500, BTU per pound based on complete conversion to carbon dioxide and water.

The introduction of the extraneous fuel occurs at the beginning of sustained engine operation, and preferably is essentially coincident with the beginning of the engine start-up period. If desired, however, this fuel introduction may be halted before the end of the start-up period or extend therebeyond, but the former may give less acceptable reductions in the amount of pollutants passed into the atmosphere, while the latter may be needlessly expensive in leading to too much fuel consumption and give rise to the inconvenience of refilling an extraneous fuel supply tank more often without sufficient compensating advantages resulting. Generally, the engine start-up period can be taken as essentially complete when the inlet end of the subsequent catalyst is at least about 400° F., preferably at least about 500° F. Catalyst temperatures usually do not materially exceed about 1,400° F. in either the initial or subsequent catalyst zones at any time during operation of the engine. The extraneous fuel should not contain a significant amount of catalyst poisons such as lead or phosphorus. It is preferred to operate the engine with a fuel that is essentially free of these and other catalyst poisons, and this primary engine fuel is preferably hydrocarbon in nature or may contain combined oxygen and thus of the types described above as extraneous fuels.

The initial catalyst is preferably at the unitary or honeycomb-type in a form which promotes the oxidation reactions described above. The supported oxidation catalyst can comprise a unitary, solid refractory skeletal structure having, for instance, cordierite as the support. The skeletal structure is usually cylindrical, but not necessarily circular in cross-section, and can have pores in its interior portion and also superficial pores and/or perforations communicating with gas flow channels which extend through the skeletal structure. The channels can be of various shapes in cross-section. An activated, refractory oxide, for instance, a gamma family or activated-type alumina, can be formed on the surface of gas flow channels and also on the surfaces of the superficial pores which communicate with the channels. The more active catalytic metal component can be carried by the active refractory oxide, and can contain, for instance, a platinum group metal, or combinations thereof deposited on the active refractory metal oxide. Some of the catalytic metal may also be deposited directly on the skeletal structure surfaces. Preferably, the catalytic metal component includes a catalytically-effective amount of palladium.

The unitary, skeletal structure support of the initial oxidation catalyst is characterized by having a large plurality of flow channels or paths extending therethrough in the general direction of gas flow. The supported catalyst is usually disposed in a vessel in such fashion that its unitary skeletal structure occupies the major part of the cross-sectional area of the reaction zone. Advantageously, the unitary skeletal structure is shaped to fit the reaction zone of the purifier casing into which it is positioned, and the unitary supported catalyst is placed therein lengthwise as to its cellular gas flow channels, i.e., with the channels extending in the general direction of gas flow between the purifier inlet and outlet, so that the gases flow through the channels during their passage through the vessel. The flow channels need not pass straight through the catalyst structure and may contain flow diverters or spoliers.

The skeletal structure support is preferably constructed of a substantially chemically and relatively catalytically inert, rigid, solid material capable of maintaining its shape and strength at high temperatures, for instance up to about 1,100° C. or more. The support may have a low thermal coefficient of expansion, good thermal shock resistance, and low thermal conductivity. Often, the skeletal support is porous but its surface may be relatively non-porous, and it may be desirable to roughen its surfaces so that they hold the catalyst better, especially if the support is relatively non-porous. The support may be metallic or ceramic in nature or a combination thereof. Although the support may be a glass ceramic, it is preferably unglazed and may be essentially entirely crystalline in form and marked by the absence of any significant amount of glassy or amorphous matrices, for instance of the type found in porcelain materials. Further, the skeletal structure may have considerable accessible porosity as distinguished from the substantially non-porous porcelain utilized for electrical applications, for instance in spark plugs, characterized by having relatively little accessible porosity. The walls of the channels of the unitary skeletal support structures can contain a multiplicity of surface macropores in communication with the channels to provide a considerably increased accessible catalyst surface, and a substantial absence of small pores for high temperature stability and strength.

The channels through the unitary body or skeletal structure can be of any shape and size consistent with the desired superficial surface and should be large enough to permit relatively free passage of the gas mixture of exhaust gas, extraneous fuel, and oxygen-containing gas. The channels may be parallel or generally parallel and extend through the support from one side to an opposite side, such channels being separated from one another by preferably thin walls. The channels may also be multi-directional and may even communicate with one or more adjacent channels. The channel inlet openings can be distributed across the entire face or cross-section of the support subject to initial contact with the gas to be reacted. The preferred skeletal structure supports are comprised of cordierite, cordeirite-alpha alumina, zircon-mullite, spodumene, alumina-silica-magnesia and zirconium silicate. Examples of other refractory ceramic materials utilizable in place of the preferred materials as support or carrier are sillimanite, magnesium silicates, zircon, petalite, alpha-alumina and aluminosilicates.

The gas flow channels of the unitary, skeletal supported catalyst may be thin-walled channels providing a relatively large amount of superficial surface area. The channels can be one or more of a variety of cross-sectional shapes and sizes. The channels can be of the cross-sectional shape of, for example, a trapezoid, rectangle, square, sinusoid, or circle, so that cross-sections of the support represent a repeating pattern that can be described as a honeycomb, corrugated or lattice structure. The walls of the cellular channels are generally of a thickness necessary to provide a strong unitary body, and the thickness will often fall in the range of about 2 to 10 mils. With this wall thickness, the structures may contain from about 100–2,500 or more gas inlet openings for the flow channels per square inch and a corresponding number of the gas flow channels, preferably about 150 to 500 gas inlet and flow channels per square inch. The open area of the cross-section may be in excess of 60 percent of the total area. The size and dimensions of the unitary refractory skeletal support of this invention can be varied.

The refractory oxide in the preferred embodiment of the catalyst is deposited on the unitary skeletal support as continuous or discontinuous thin deposits. Such catalytically-active oxides may be a calcined refractory metal oxide which itself is characterized by a porous structure and which possesses a relatively large internal pore volume and total surface area. Generally, the total surface area of the active refractory oxode is at least about 25 square meters/gram, preferably at least about 100 square meters/gram. Such oxides can be prepared by dehydrating a hydrate form of the oxide by calcination, usually at temperatures of about 150° to 800° C. The preferred active oxides contain members of the gamma or activated alumina family, such as gamma or eta alumina, which can be prepared, for instance, by precipitating a hydrous alumina gel and thereafter drying and calcining to expel hydrated water and provide the active alumina. A particularly preferred active refractory metal oxide is obtained by drying and calcining at temperatures of about 300° to 800° C., a mixture of precursor hydrous alumina phases predominating in crystalline trihydrate, that is, containing in excess of about 50 percent of the total alumina hydrate composition, preferably at least about 65 percent, of one or more of the trihydrate forms gibbsite, bayerite and nordstrandite, as determined by X-ray diffraction. The substantial balance of the hydrate may be amorphous, hydrous, or boehmite alumina or their mixtures. Other suitable active oxides include, for example, active or calcined beryllia, zirconia, magnesia, silica, spinels, etc., and combinations of oxides such as thoria-alumina, titania-alumina, zirconia-alumina, silica-alumina, alumina-alkaline earth metal oxides, etc. Preferably, the activated refractory oxide is composed predominantly of oxides of one or more metals of Groups II, III and IV having atomic numbers not exceeding 40. The active refractory oxide deposit may constitute, for example, about 10 to 150 grams per liter of the unitary support, preferably about 30 to 120 grams per liter.

The initial catalyst used in this invention may contain platinum group metals, e.g., platinum, rhodium, ruthenium, palladium or iridium, base metals, or combinations thereof, or their oxides or other combined forms. The metal is present in a catalytically-effective amount, and is usually a minor weight percent of the total catalytic element 17, e.g., about 0.01 to 2 wt. percent of the platinum group metal, preferably about 0.1 to 1.5 percent. The catalytic element may contain, with or without the platinum group metals, one or more catalytic materials which may include, for example, chromium, manganese, vanadium, copper, iron, cobalt, nickel, rare earths, and the like.

The relative sizes of the initial and subsequent catalytic elements may be such that their volume ratio, i.e., the superficial volume of the subsequent catalyst to the initial catlyst, including void spaces within the catalytic masses, is often at least about 2:1, preferably at least about 10:1. This ratio usually does not exceed about 100:1, and preferably is not above about 50:1. Thus, the gas space velocity in the initial catalyst will usually be greater than in the subsequent catalyst during the engine start-up procedure. The subsequent catalyst may often have a length to diameter ratio of about 0.1:1 to 2:1, preferably about 0.5:1 to 1:1, while the initial catalyst may have a length to diameter ratio of about 0.1:1 to 10:1, preferably about 2:1 to 5:1.

Although it is preferred that the subsequent catalyst, e.g., that in element 24, be of the honeycomb or unitary type as described above with respect to the initial catalyst, either or both catalysts may be composed of particulate catalyst or pellets. Such particles often have diameters of about one sixty-fourth to one-half inch, preferably one thirty-second to one-fourth inch, and, if not spherical, lengths of about one sixty-fourth to 1 inch or somewhat more, preferably about one thirty-second to one-fourth inch. These catalyst particles can be arranged in various configurations, but often cylindrical beds are employed.

Although it is preferred that the subsequent catalyst, whether in unitary, particulate or other form, contain one or more platinum group metals as a catalytically-active component, other materials may form part or all of the active component. These other active materials include the base metals and rare earths, and thus the subsequent catalyst may contain one or more of the platinum group metals, especially platinum or palladium, iron group metals, vanadium, manganese, copper, tungsten, cerium, and the like, in metallic or combined forms such as the oxides or sulfides. Also, these active materials may be carried by catalytically-active or inactive, solid supports of, for instance, the types described above with respect to the initial catalyst, or combinations of such active and inactive materials. When supported, the catalysts often, but not necessarily, have a minor weight amount of the catalytically-active metal component.

It is claimed:

1. A method for oxidizing constituents of exhaust gas from an internal combustion engine, said gas containing carbon monoxide and hydrocarbon, which comprises passing, during startup of said engine, a mixture containing said gas and molecular oxygen to a first catalyst, passing effluent gases from said first catalyst to a subsequent catalyst in sequential gas flow relationship with respect to said first catalyst, passing supplemental fuel to said first catalyst during engine start-up, and continuing said passage of supplemental fuel to said first catalyst at least until the subsequent catalyst is at a temperature at which it is effective in promoting the oxidation of carbon monoxide in said exhaust gas.

2. The process of claim 1 in which the supplemental fuel is an alkanol of 1 to 4 carbon atoms.

3. The process of claim 2 in which the alkanol is methanol.

4. The process of claim 1 in which the first catalyst contains palladium.

5. The process of claim 4 in which the supplemental fuel is methanol.

6. A method for oxidizing constituents of exhaust gas from an internal combustion engine having an exhaust manifold, said gas containing carbon monoxide and hydrocarbon, which comprises passing, during start-up of said engine, a mixture containing said gas and molecular oxygen to a first catalytic converter vessel positioned closely-adjacent to said exhaust manifold, passing effluent gases from said first catalytic converter vessel to a separate catalytic converter vessel positioned in a spaced-away gas flow relationship with respect to said first catalytic converter, passing a supplemental fuel to said first catalytic converter during engine start-up, and continuing said passage of supplemental fuel to said first catalytic converter at least until the catalyst in said subsequent catalytic converter is at a temperature at which it is effective in promoting the oxidation of carbon monoxide in said exhaust gas.

7. The process of claim 6 in which the supplemental fuel is an alkanol of 1 to 4 carbon atoms.

8. The process of claim 7 in which the alkanol is methanol.

9. A method for oxidizing constituents of exhaust gas from an internal combustion engine having an exhaust manifold, said gas containing carbon monoxide and hydrocarbon, which comprises passing, during start-up of said engine, a mixture containing said gas and molecular oxygen to a first catalytic converter vessel positioned closely-adjacent to said exhaust manifold, passing effluent gases from said first catalytic converter vessel to a subsequent, separate catalytic converter vessel positioned in a spaced-away gas flow relationship with respect to said first catalytic converter, passing a supplemental fuel to said first catalytic converter during engine start-up, and continuing said passage of supplemental fuel to said first catalytic converter for a predetermined time period during which the catalyst in said subsequent catalytic converter reaches a temperature at least sufficient to make it effective in promoting the oxidation of carbon monoxide in said exhaust gas.

10. The process of claim 9 in which subsequent to said timed period, exhaust gas is by-passed around said first catalytic converter and into said subsequent catalytic converter.

11. The process of claim 10 in which the supplemental fuel is an alkanol of 1 to 4 carbon atoms.

12. The process of claim 11 in which the alkanol is methanol.

13. A method for oxidizing constituents of exhaust gas from an internal combustion engine having an exhaust manifold and having a hydrocarbon fuel burned in said engine, said gas containing carbon monoxide and hydrocarbons, which comprises passing, during start-up of said engine, a mixture containing said gas and molecular oxygen to a first catalytic converter vessel positioned closely-adjacent to said exhaust manifold and containing a platinum group metal-containing unitary catalyst having gas flow passages therethrough, at least the major portion of the molecular oxygen being supplied to said mixture after withdrawal of the exhaust gas from said engine, passing effluent gases from said first catalytic converter vessel to a subsequent, separate catalytic converter vessel positioned in a spaced-away gas flow relationship to said first catalytic converter, passing a supplemental fuel to said first catalytic converter during engine startup, and continuing said passage of supplemental fuel to said first catalytic converter at least until the catalyst in said subsequent catalytic converter has reached a temperature at which it is effective in promoting the oxidation of carbon monoxide in said exhaust gas.

14. The process of claim 13 in which said passage of supplemental fuel is stopped and subsequently exhaust gas is by-passed around said first catalytic counter and, along with oxygen, is introduced into said subsequent catalytic converter.

15. The process of claim 14 in which the supplemental fuel is methanol.

16. The process of claim 15 in which the catalyst in said first catalytic converter contains palladium.

17. The process of claim 13 in which the supplemental fuel is introduced into the exhaust gas for a predetermined time period.

18. The process of claim 17 in which the catalyst in the subsequent catalytic converter is of the unitary type, having gas flow passages therethrough.

19. The process of claim 18 in which the catalyst in said first catalytic converter contains palladium.

20. The process of claim 19 in which the supplemental fuel is methanol.

* * * * *